(12) United States Patent
Hwang et al.

(10) Patent No.: US 12,706,226 B2
(45) Date of Patent: Aug. 11, 2026

(54) METHOD FOR REMOVING DOUSING TANK OF HEAVY WATER REACTOR STRUCTURE

(71) Applicant: KOREA HYDRO & NUCLEAR POWER CO., LTD, Gyeongju-si Gyeongsangbuk-do (KR)

(72) Inventors: Seok Ju Hwang, Daejeon (KR); Young Hwan Hwang, Daejeon (KR); Si Young Kim, Daejeon (KR); Cheon Woo Kim, Daejeon (KR)

(73) Assignee: KOREA HYDRO & NUCLEAR POWER CO., LTD, Gyeongsangbuk-do (KR)

( * ) Notice: Subject to any disclaimer, the term of this patent is extended or adjusted under 35 U.S.C. 154(b) by 93 days.

(21) Appl. No.: 18/718,618

(22) PCT Filed: Jan. 13, 2023

(86) PCT No.: PCT/KR2023/000632
§ 371 (c)(1),
(2) Date: Jan. 6, 2025

(87) PCT Pub. No.: WO2023/136649
PCT Pub. Date: Jul. 20, 2023

(65) Prior Publication Data

US 2025/0182920 A1 Jun. 5, 2025

(30) Foreign Application Priority Data

Jan. 14, 2022 (KR) ........................ 10-2022-0005629

(51) Int. Cl.
*G21C 21/00* (2006.01)
*B23P 6/04* (2006.01)
(Continued)

(52) U.S. Cl.
CPC ............... *G21C 21/00* (2013.01); *B28D 1/22* (2013.01); *G21C 15/18* (2013.01); *B23P 6/04* (2013.01); *G21C 19/207* (2013.01)

(58) Field of Classification Search
CPC ... B23P 6/04; B23P 6/00; G21C 31/00; G21C 19/207; B28D 1/22; B28D 1/24
See application file for complete search history.

(56) References Cited

U.S. PATENT DOCUMENTS

2021/0296017 A1 9/2021 Jeong et al.

FOREIGN PATENT DOCUMENTS

JP H10111397 A 4/1998
JP 2013-249595 A 12/2013
(Continued)

OTHER PUBLICATIONS

Machine Translation of JP 2018-145622 A (Year: 2018).*
(Continued)

*Primary Examiner* — Christopher J. Besler
(74) *Attorney, Agent, or Firm* — HARNESS, DICKEY & PIERCE, P.L.C.

(57) ABSTRACT

There is provided a method of dismantling a dousing tank of a heavy water reactor structure. The method of dismantling a dousing tank of a heavy water reactor structure includes: selecting a dousing tank of a heavy water reactor structure for dismantlement; dismantling a 1st structure inside the dousing tank; fixing the dousing tank to a dome structure portion provided above the dousing tank through a mounting port; positioning a cutting unit on a 2nd structure including a concrete structure inside the dousing tank; and performing, by the cutting unit, cutting based on a forward or reverse rotation manner on an inner peripheral surface of the dousing tank.

3 Claims, 7 Drawing Sheets

(51) Int. Cl.

| | |
|---|---|
| ***B28D 1/22*** | (2006.01) |
| ***G21C 15/18*** | (2006.01) |
| ***G21C 19/20*** | (2006.01) |

(56) References Cited

FOREIGN PATENT DOCUMENTS

| | | | |
|---|---|---|---|
| JP | 2018-145622 | A | 9/2018 |
| JP | 2020-148004 | A | 9/2020 |
| KR | 101382256 | B1 | 4/2014 |
| KR | 10-2015-0018292 | A | 2/2015 |
| KR | 101502395 | B1 | 3/2015 |
| KR | 10-2021-0058494 | A | 5/2021 |
| KR | 102300638 | B1 | 9/2021 |

OTHER PUBLICATIONS

International Search Report for International Application No. PCT/KR2023/000632 dated Apr. 21, 2023.

Written Opinion of the International Searching Authority for International Application No. PCT/KR2023/000632 dated Apr. 21, 2023.

* cited by examiner

METHOD FOR REMOVING DOUSING TANK OF HEAVY WATER REACTOR STRUCTURE

CROSS-REFERENCE TO RELATED APPLICATIONS

This application is a national phase under 35 U.S.C. § 371 of PCT International Application No. PCT/KR2023/000632 which has an International filing date of Jan. 13, 2023, which claims priority to Korean Application No. 10-2022-0005629, filed Jan. 14, 2022, the entire contents of each of which are hereby incorporated by reference.

TECHNICAL FIELD

The present disclosure relates to a method of dismantling a dousing tank of a heavy water reactor structure.

BACKGROUND ART

In spite of an operation of a heavy water reactor nuclear power plant, it is estimated that there is no case of dismantling such a heavy water reactor nuclear power plant. At the uppermost end inside a reactor building of the heavy water reactor nuclear power plant, a dousing tank for pressure reinforcement and emergency core cooling during high pressure in the reactor building is installed. A dousing tank concrete structure inside a reactor is radioactive waste, and an appropriate process and device for safely dismantling the dousing tank concrete structure are required.

DISCLOSURE

Technical Problem

Aspects of the present disclosure provide a method of dismantling a dousing tank of a heavy water reactor structure capable of safely dismantling a dousing tank structure that is a contaminated concrete structure positioned at an upper portion of the heavy water reactor structure.

Aspects of the present disclosure also provide a method of dismantling a dousing tank of a heavy water reactor structure capable of preventing a worker from being exposed to contaminated dust in dismantling the heavy water reactor structure.

Aspects of the present disclosure also provide a method of dismantling a dousing tank of a heavy water reactor structure capable of eliminating a risk factor occurring in a dismantling process through specialized dismantling of a specific structure including the dousing tank.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

Technical Solution

According to an aspect of the present disclosure, there is provided a method of dismantling a dousing tank of a heavy water reactor structure including: selecting a dousing tank of a heavy water reactor structure for dismantlement; dismantling a 1st structure inside the dousing tank; fixing the dousing tank to a dome structure portion provided above the dousing tank through a mounting port; positioning a cutting unit on a 2nd structure including a concrete structure inside the dousing tank; and performing, by the cutting unit, cutting based on a forward or reverse rotation manner on an inner peripheral surface of the dousing tank.

The cutting unit may separate an upper body of the dousing tank from a lower body of the dousing tank through the cutting, and allow the separated upper body to be moved into the lower body.

The cutting unit may include: a base portion seated on the 2nd structure; and a driving portion holding the upper body and positioned on the base portion, the driving portion may include a cutting body driven in a forward or reverse rotation manner along a circumferential portion to perform the cutting on the dousing tank, and the driving portion may allow the upper body to enter the lower body by descending while holding the cut upper body thereon.

A recovery module positioned at a peripheral portion of the cutting unit and recovering a cut material scattered from the dousing tank by the cutting may be provided, the recovery module may include a 1st recovery portion positioned in a 1st area on one side with respect to the driving portion and a 2nd recovery portion positioned in a 2nd area on the other side with respect to the driving portion, the 1st recovery portion may recover the cut material generated on the 1st area when the cutting body performs the cutting while rotating and passing through the 1st area and the 2nd area in a circumferential direction, and the 2nd recovery portion may recover the cut material generated on the 2nd area when the cutting body performs the cutting while rotating and passing through the 1st area and the 2nd area in the circumferential direction.

A 1st guidance module guiding the cut material to the 1st recovery portion may be provided on the 1st area, and a 2nd guidance module guiding the cut material to the 2nd recovery portion may be provided on the 2nd area.

The 1st guidance module may have an upper end provided on an inner wall of the dousing tank and the driving portion and may have a lower end provided to be tapered to the 1st recovery portion to guide the cutting material to the 1st recovery portion, and the 2nd guidance module may have an upper end provided on an inner wall of the dousing tank and the driving portion and may have a lower end provided to be tapered to the 2nd recovery portion to guide the cutting material to the 2nd recovery portion.

The 1st and 2nd guidance modules may each include at least one of metal, vinyl, plastic, fabric, rubber, and glass.

The 1st structure may include a spray means inside the dousing tank, and the 2nd structure may include the concrete structure inside the dousing tank.

At least one of the dousing tank, the 1st structure, and the 2nd structure may be exposed to and contaminated by radioactivity.

Advantageous Effects

The method of dismantling a dousing tank of a heavy water reactor structure according to the present disclosure as described above has one or more of the following effects.

The present disclosure may provide a method of dismantling a dousing tank of a heavy water reactor structure capable of safely dismantling a dousing tank structure that is a contaminated concrete structure positioned at an upper portion of the heavy water reactor structure.

In addition, the present disclosure may provide a method of dismantling a dousing tank of a heavy water reactor structure capable of preventing a worker from being exposed to contaminated dust in dismantling the heavy water reactor structure.

Further, the present disclosure may provide a method of dismantling a dousing tank of a heavy water reactor structure capable of eliminating a risk factor occurring in a dismantling process through specialized dismantling of a specific structure including the dousing tank.

MODE FOR INVENTION

Figure 1:
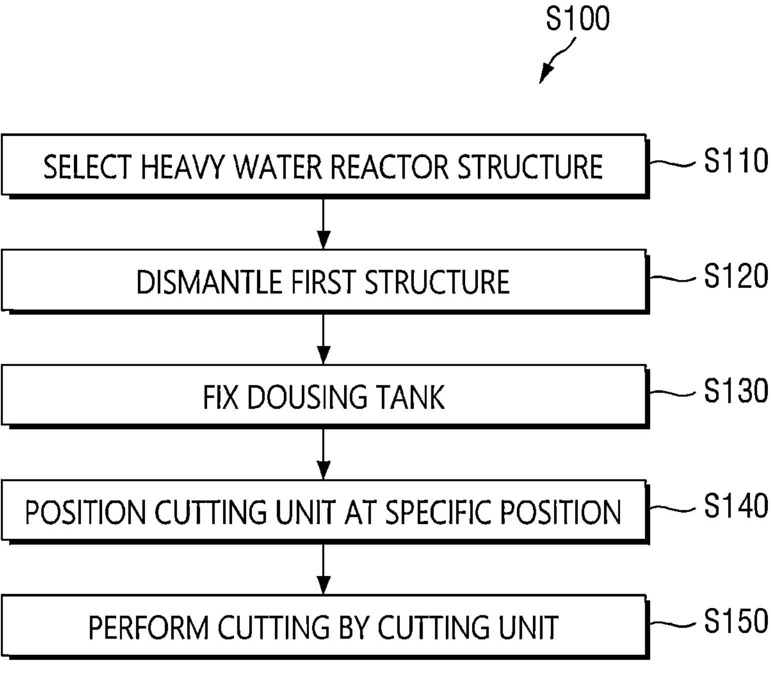
FIG. 1 is a flowchart sequentially illustrating a method of dismantling a dousing tank of a heavy water reactor structure according to an embodiment of the present disclosure.

Hereinafter, embodiments of the present disclosure will be described in detail with reference to the accompanying drawings. Advantages and features of the present disclosure and methods for accomplishing these advantages and features will become apparent from embodiments to be described later in detail with reference to the accompanying drawings. However, the present disclosure is not limited to embodiments to be disclosed below, but may be implemented in various different forms, these embodiments will be provided only in order to make the present disclosure complete and allow one of ordinary skill in the art to completely recognize the scope of the present disclosure, and the present disclosure will be defined by the scope of the claims. Throughout the specification, the same components will be denoted by the same reference numerals.

Figure 2:
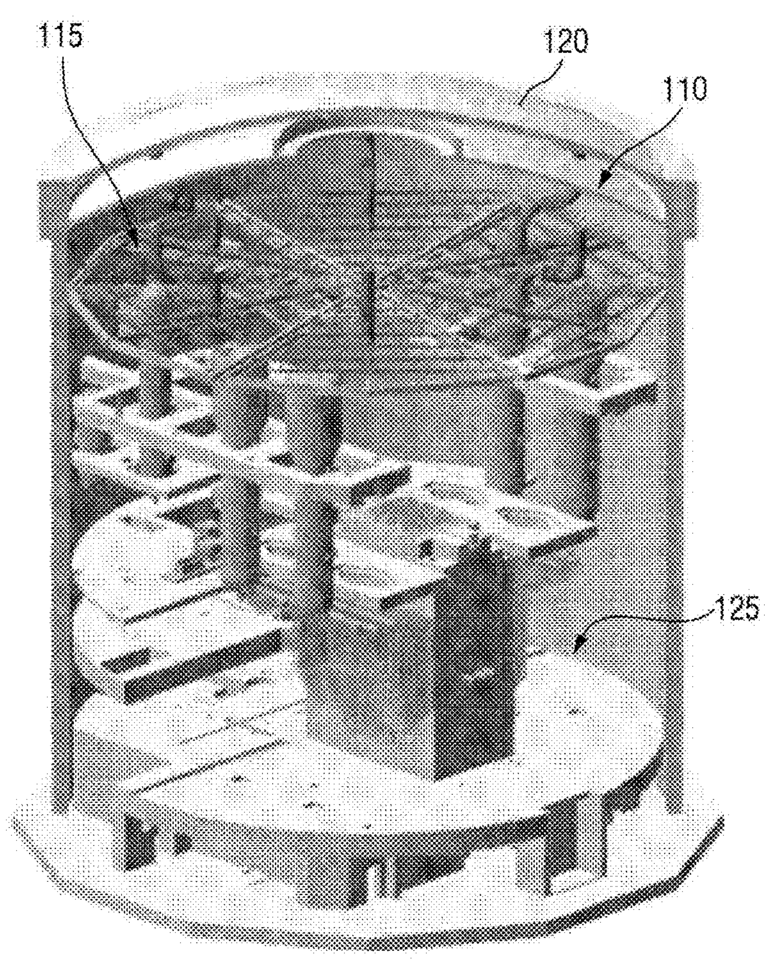
FIG. 2 is a view illustrating a configuration according to FIG. 1.

Referring to FIG. 1, a method of dismantling a dousing tank of a heavy water reactor structure according to an embodiment of the present disclosure is a method of dismantling a dousing tank 110 of a heavy water reactor structure, and the dousing tank 110 for dismantlement is selected (see FIG. 2).

Figure 3:
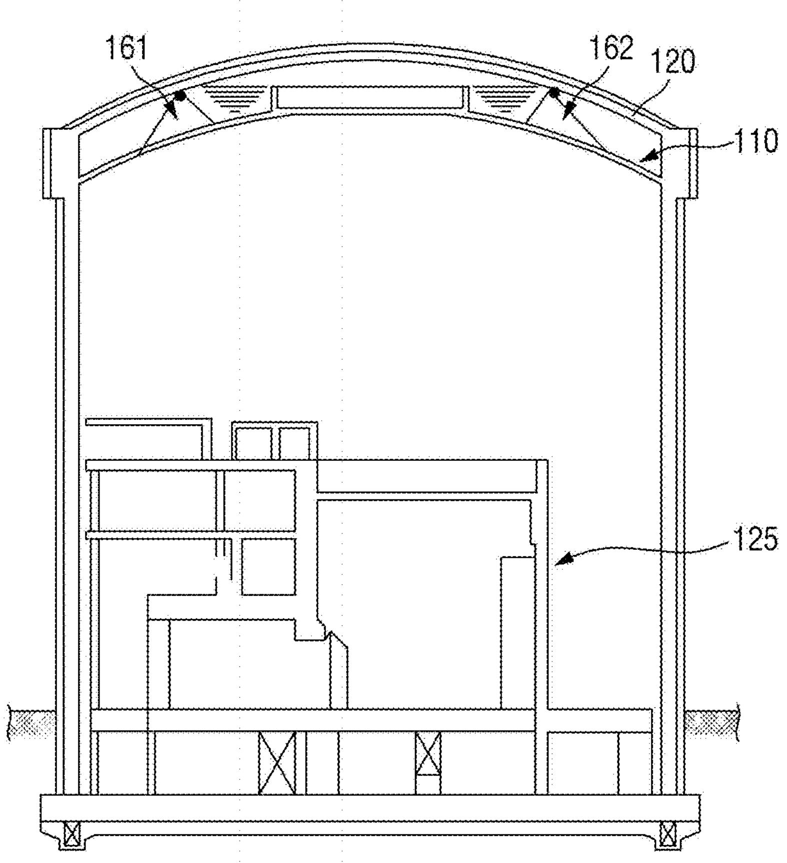
FIGS. 3 to 7 are views illustrating a dousing tank dismantling process.

Here, a 1st structure 115 inside the dousing tank 110 is dismantled. Next, the dousing tank 110 is fixed to a dome structure portion 120 provided thereabove through mounting ports 161 and 162 (see FIG. 3).

Figure 4:
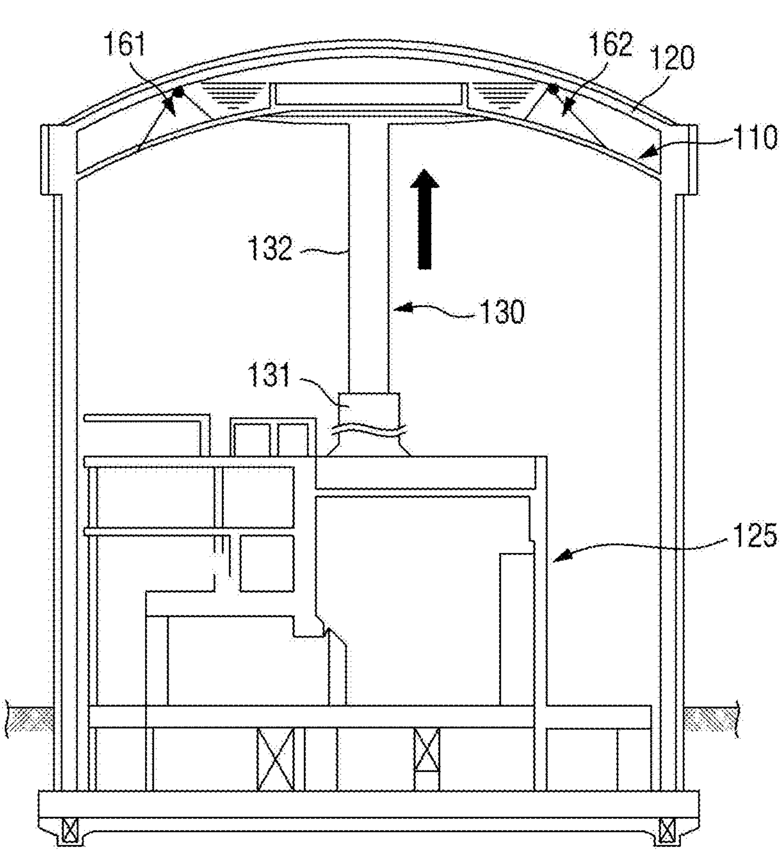
Figure 5:
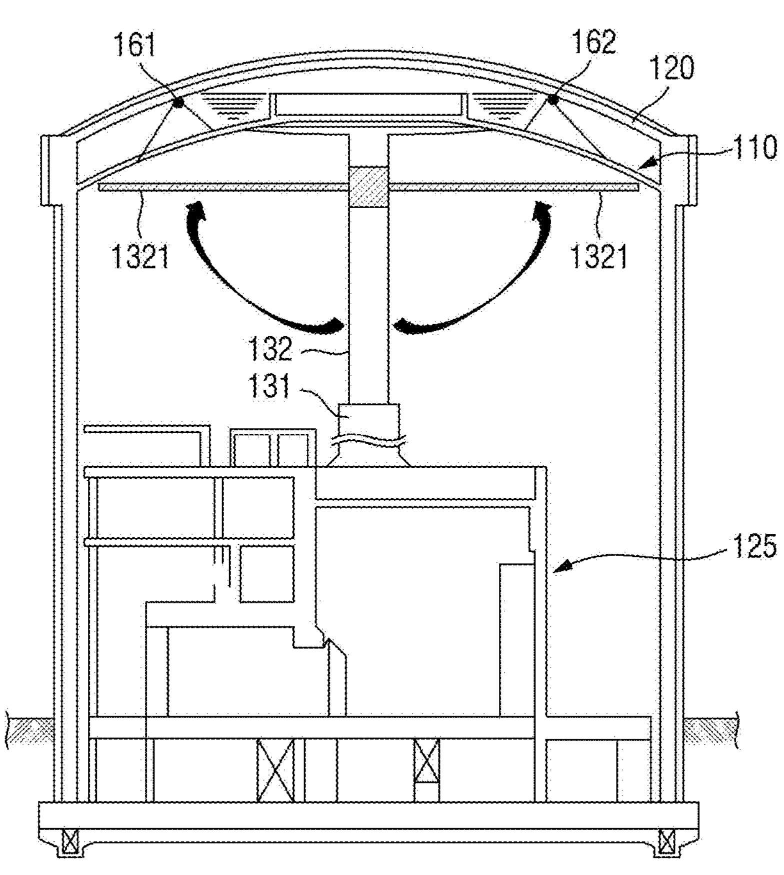

A cutting unit 130 is positioned on a 2nd structure 125 including a concrete structure inside the dousing tank 110. Next, the cutting unit 130 performs cutting based on a forward or reverse rotation manner on an inner peripheral surface of the dousing tank 110 (see FIGS. 4 to 6).

Figure 7:
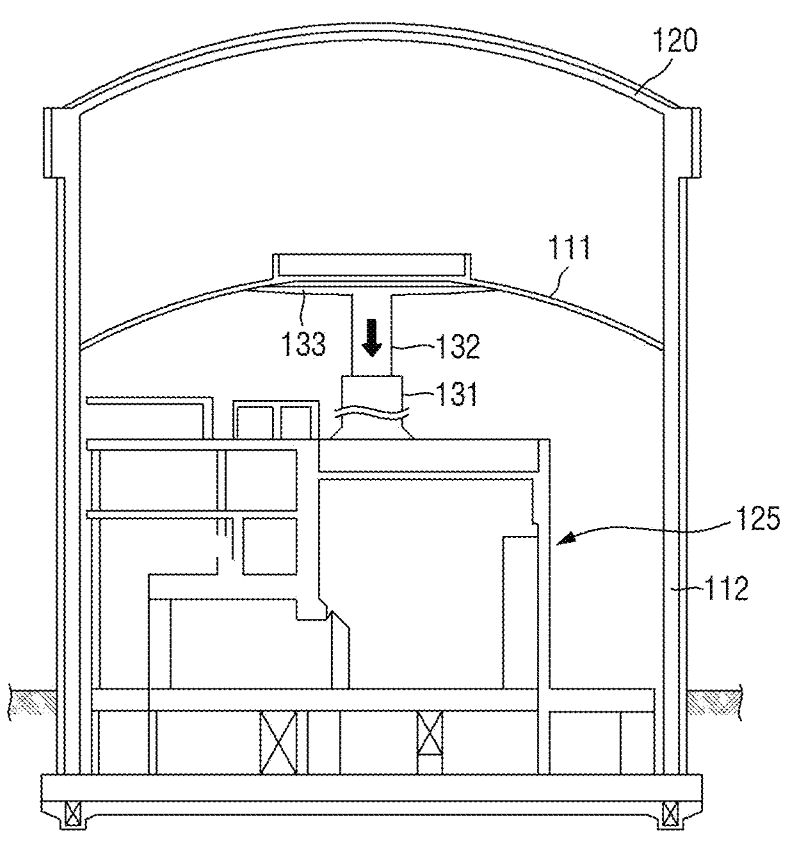

Meanwhile, the cutting unit 130 separates an upper body 111 of the dousing tank 110 from a lower body 112 of the dousing tank 110 through the cutting, and allows the separated upper body 111 to be moved into the lower body 112 (see FIG. 7).

A base portion 131 of the cutting unit 130 is seated on the 2nd structure 125. The driving portion 132 of the cutting unit 130 holds the upper body 111 and is positioned on the base portion 131 (see FIG. 4).

In addition, a cutting body 1321 of the driving portion 132 is driven in a forward or reverse rotation manner along a circumferential portion. Such a cutting body 1321 performs the cutting on the dousing tank 110 (see FIG. 5).

Such a driving portion 132 allows the upper body 111 to enter the lower body 112 by descending while holding the cut upper body 111 thereon. In addition, recovery modules 141 and 142 are positioned at a peripheral portion of the cutting unit 130 and recover cut materials scattered from the dousing tank 110 by the cutting (see FIGS. 5 to 7).

A 1st recovery portion 141 of the recovery modules 141 and 142 is positioned in a 1st area S1 on one side with respect to the driving portion 132. A 2nd recovery portion 142 of the recovery module 141 is positioned in a 2nd area S2 on the other side with respect to the driving portion 132 (see FIG. 6).

Figure 6:
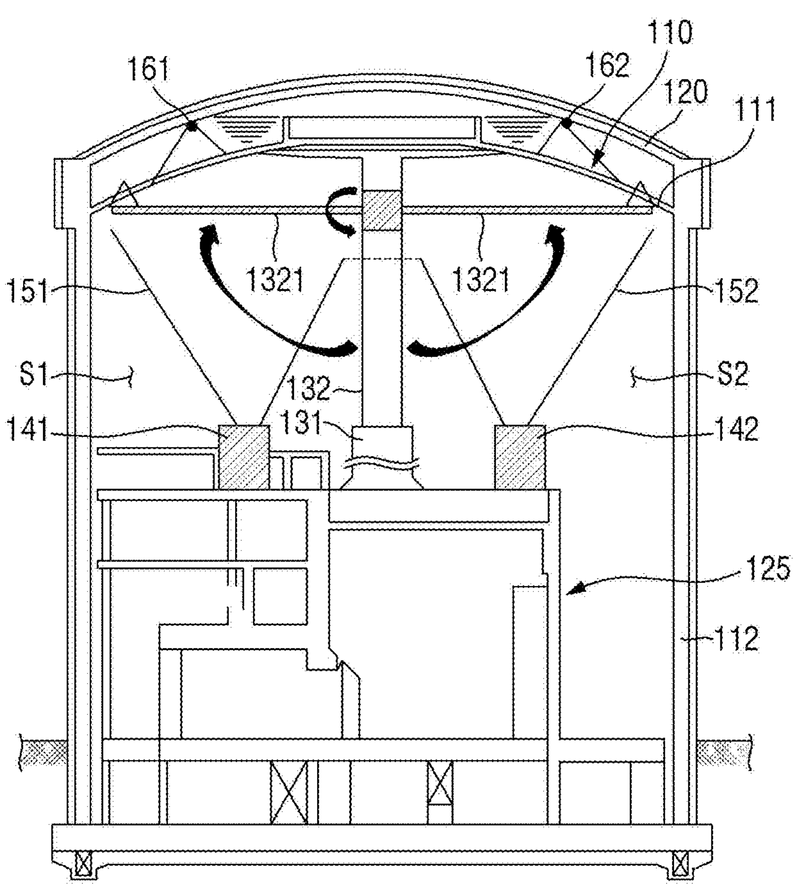

Here, the 1st recovery portion 141 recovers the cut material generated on the 1st area S1 when the cutting body 1321 performs the cutting while rotating and passing through the 1st area S1 and the 2nd area S2 in a circumferential direction (see FIG. 6).

The 2nd recovery portion 142 recovers the cut material generated on the 2nd area S2 when the cutting body 1321 performs the cutting while rotating and passing through the 1st area S1 and the 2nd area S2 in the circumferential direction (see FIG. 6).

Meanwhile, a 1st guidance module 151 guides the cut material to the 1st recovery portion 141, on the 1st area S1. A 2nd guidance module 152 guides the cut material to the 2nd recovery portion 142, on the 2nd area S2 (see FIG. 6).

The 1st guidance module 151 has an upper end provided on an inner wall of the dousing tank 110 and the driving portion 132. The 1st guidance module 151 has a lower end provided to be tapered to the 1st recovery portion 141 to guide the cutting material to the 1st recovery portion 141 (see FIG. 6).

In addition, the 2nd guidance module 152 has an upper end provided on an inner wall of the dousing tank 110 and the driving portion 132. The 2nd guidance module 152 has a lower end provided to be tapered to the 2nd recovery portion 142 to guide the cutting material to the 2nd recovery portion 142 (see FIG. 6).

The 1st and 2nd guidance modules 151 and 152 each include at least one of metal, vinyl, plastic, fabric, rubber, and glass.

In this case, the 1st structure 115 includes a spray means inside the dousing tank 110, and the 2nd structure 125 includes the concrete structure inside the dousing tank 110. At least one of the dousing tank 110, the 1st structure 115, and the 2nd structure 125 may be exposed to and contaminated by radioactivity (see FIGS. 2 and 3).

The embodiments of the present disclosure have been described hereinabove with reference to the accompanying drawings, but it will be understood by one of ordinary skill in the art to which the present disclosure pertains that various modifications and alterations may be made without departing from the technical spirit or essential feature of the present disclosure. Therefore, it is to be understood that the embodiments described above are illustrative rather than being restrictive in all aspects.

The invention claimed is:

1. A method comprising:

selecting a dousing tank of a heavy water reactor structure for dismantlement;

dismantling a first structure inside the dousing tank;

fixing the dousing tank to a dome structure portion provided above the dousing tank through a mounting port;

cutting an inner surface of the dousing tank to separate the dousing tank into an upper body of the dousing tank and a lower body of the dousing tank; and moving the upper body into the lower body.

2. The method of claim 1, further comprising:

recovering cut material.

3. The method of claim 2, wherein the recovering includes guiding a first portion of the cut material to a first area within the lower body of the dousing tank, and guiding a second portion of the cut material to a second area within the lower body of the dousing tank, the first area and the second area spaced apart.

* * * * *